United States Patent [19]

Kraske

[11] Patent Number: 4,830,561
[45] Date of Patent: May 16, 1989

[54] DISPENSER SUCH AS A SALES STAND FOR ARTICLES SUCH AS REELS SPOOLS OR BOBBINS OF SEWING THREAD, YARN, ETC.

[75] Inventor: Bernhard Kraske, Gutach, Fed. Rep. of Germany

[73] Assignee: Gutermann & Co. AG, Zurich, Switzerland

[21] Appl. No.: 145,632

[22] Filed: Jan. 7, 1988

[30] Foreign Application Priority Data

Oct. 1, 1987 [DE] Fed. Rep. of Germany ....... 3733247

[51] Int. Cl.⁴ .............................................. B65G 1/00
[52] U.S. Cl. .................................... 414/276; 414/281; 414/618
[58] Field of Search ............... 414/276, 277, 331, 281, 414/618, 910, 911, 609, 610, 84; 211/59.2, 97; 198/463.3

[56] References Cited

U.S. PATENT DOCUMENTS

| 2,755,950 | 7/1956 | Forshey | 414/276 |
| 3,450,276 | 6/1969 | Ferrari | 414/276 |
| 3,786,929 | 1/1974 | Hathcock, Jr. | 414/281 X |
| 4,203,696 | 5/1980 | Lindberg | 414/331 |
| 4,579,499 | 4/1986 | Mikes | 414/276 X |
| 4,704,064 | 11/1987 | Hawley et al. | 414/609 X |

FOREIGN PATENT DOCUMENTS

| 197803 | 3/1978 | Fed. Rep. of Germany | 414/277 |
| 140736 | 3/1980 | Fed. Rep. of Germany | 414/277 |
| 3305277 | 8/1984 | Fed. Rep. of Germany | 414/277 |
| 3513734 | 3/1985 | Fed. Rep. of Germany | 414/277 |
| 7139 | 1/1986 | Japan | 414/277 |
| 623791 | 9/1978 | U.S.S.R. | 414/277 |
| 2106070 | 4/1983 | United Kingdom | 414/331 |

Primary Examiner—Robert J. Spar
Assistant Examiner—James R. Bidwell
Attorney, Agent, or Firm—Browdy & Neimark

[57] ABSTRACT

A sales stand for articles such as spools of sewing thread has a lower storage part and a sales part arranged thereabove. A carriage arrangement for transporting the spools from the storage part to the sales part includes a horizontally displaceable main carriage, a lower carriage part carried by and vertically displaceable relative to the main carriage, for transporting the spools up from the storage part to a transfer station, and an upper carriage part carried by and vertically displaceable relative to the main carriage for transporting the spools from the transfer station to the sales part. The sales part includes a plurality of compartments arranged in columns and rows, the compartments being inclined downwardly towards the front of the stand, and the upper carriage part delivers the reels to a selected individual sales compartment. Due to this division of the carriage arrangement into two, with the two carriage parts arranged one above the other, and vertically driven and controlled independently of each other, the positioning of the carriage relative to a selected sales compartment is facilitated.

13 Claims, 5 Drawing Sheets

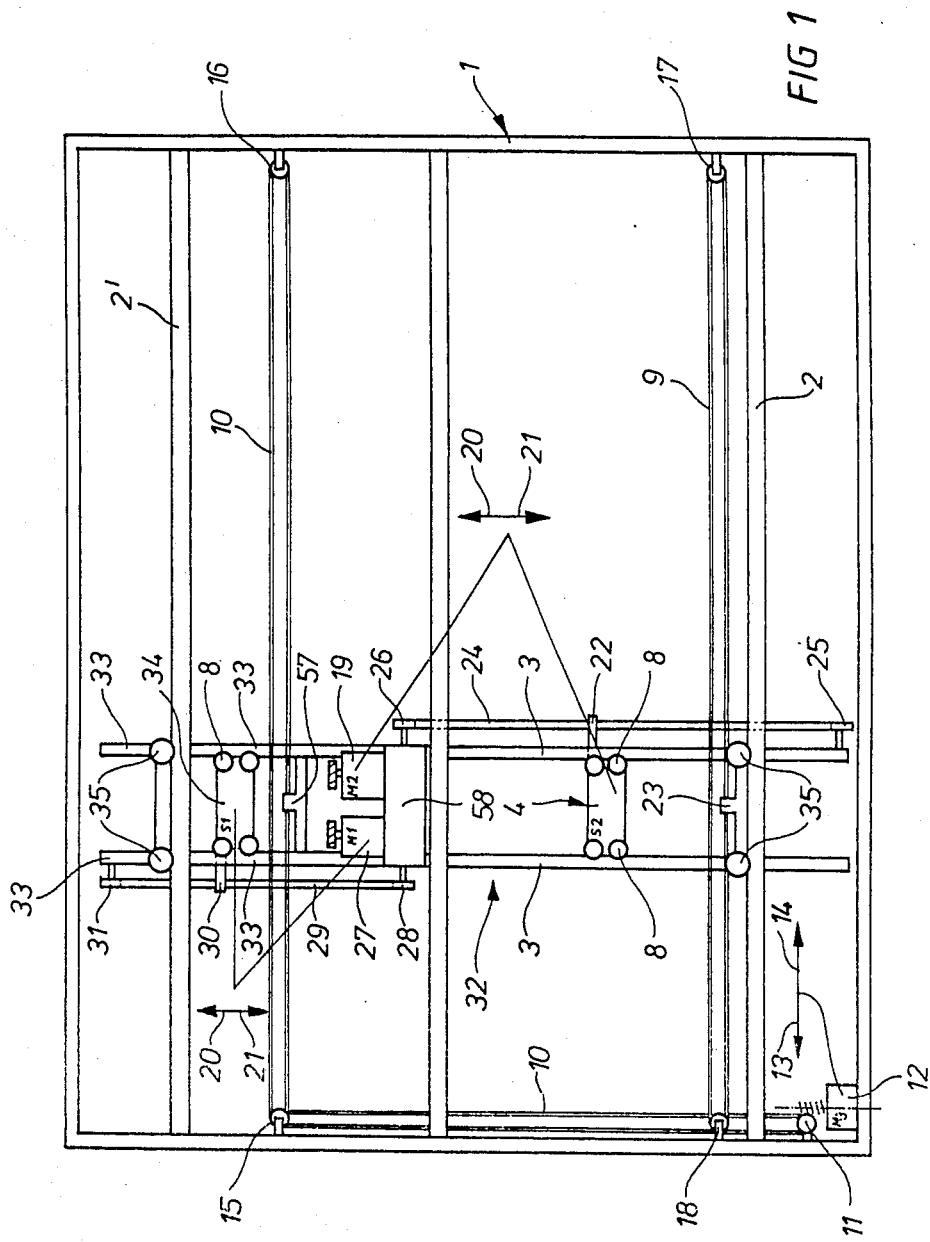

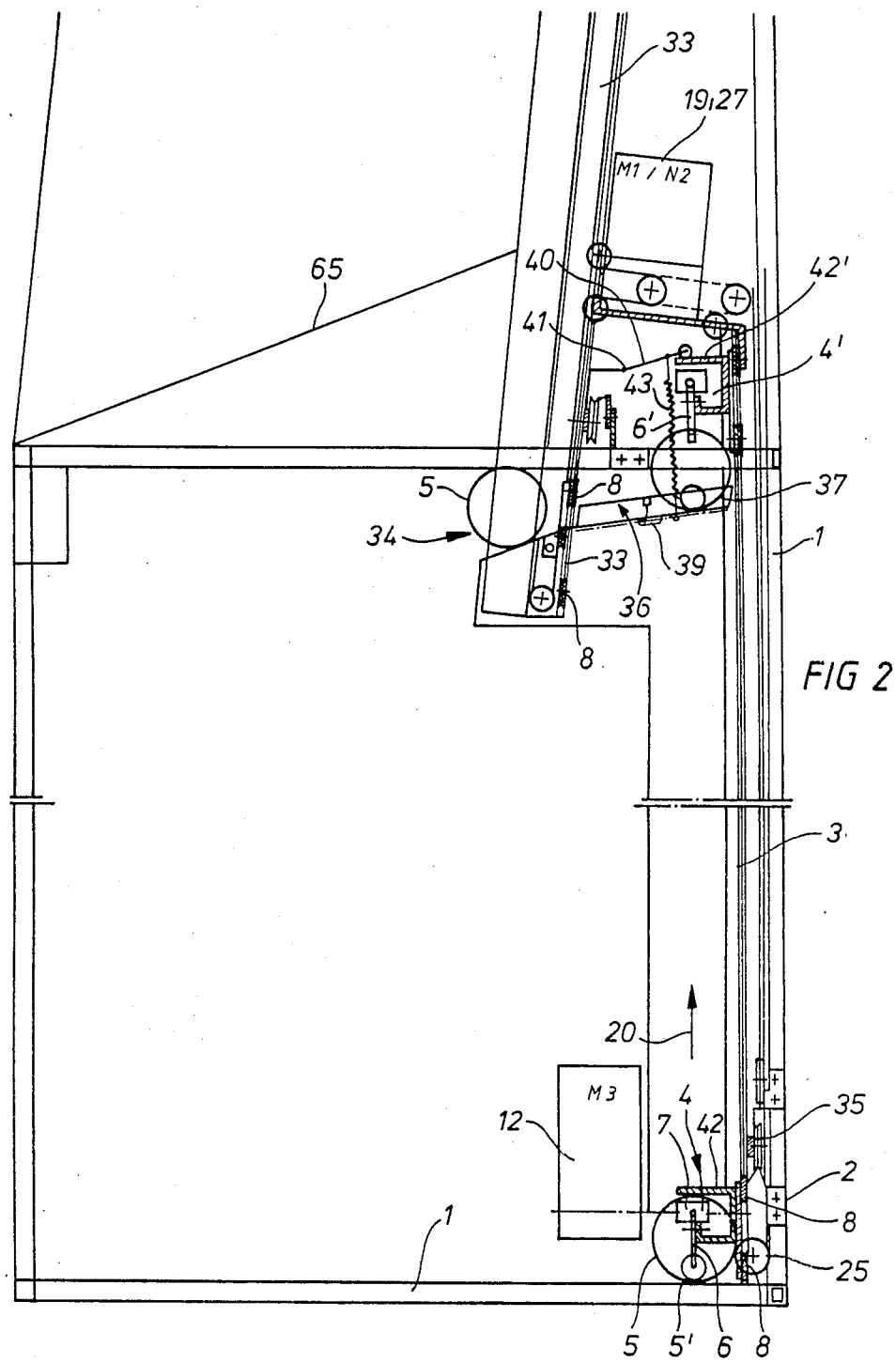

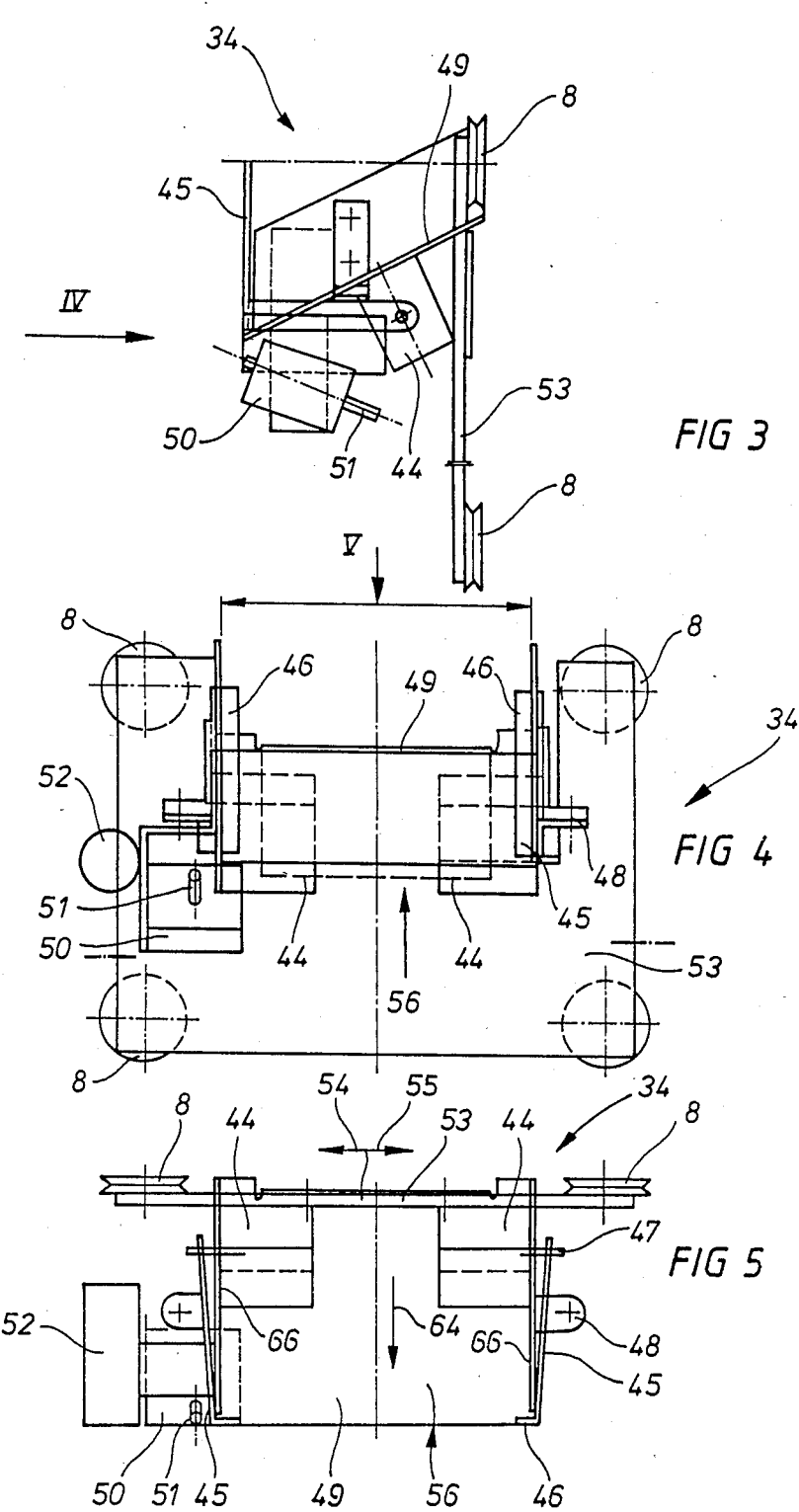

DISPENSER SUCH AS A SALES STAND FOR ARTICLES SUCH AS REELS SPOOLS OR BOBBINS OF SEWING THREAD, YARN, ETC.

BACKGROUND OF THE INVENTION

The invention relates to a dispenser such as a sales stand for articles such as reels, spools or bobbins of sewing thread, yarn, etc., having: a lower storage part, in which the articles are stored in individual storage compartments of a magazine; an upper dispenser or sales part in which the articles are located or displayed in individual dispenser or sales compartments, arranged in rows and columns, which run downwardly and are inclined towards the front of the stand, and the sales compartments having openings in their frontal regions via which the articles may be removed; and a conveying system to the rear of the sales part for the controlled transportation of the articles from the storage compartments to the sales compartments, the conveying system having a carriage which is displaceable in a horizontal direction, i.e. an X-direction, and in a vertical direction, i.e. a Y-direction, the carriage having a releasable holder for at least one article.

DESCRIPTION OF THE PRIOR ART

A sales stand of this type is the subject of earlier German Patent Application No. P 35 13 734.7, the contents of which is to be understood as being incorporated herein by reference. In the earlier application, the carriage can only be conveyed as a whole in the X- and Y-directions to transfer the articles removed from the storage magazine to the individual sales compartments.

This known sales stand, has, in itself, proved to be successful. However, it is an object of the invention to improve the positioning of the carriage relative to the sales compartments determined by the controlling arrangement of the conveying system.

BRIEF SUMMARY OF THE INVENTION

To solve this problem, according to the invention, a carriage arrangement is provided which includes a main carriage displaceable in a generally horizontal or transverse X-direction, and two carriage parts or secondary carriages which are carried by the main carriage and arranged one above the other, which are separately conveyable in a generally vertical or upright Y-direction, and which are controlled via their own drives, a transfer arrangement being provided between the two carriage parts for transferring the articles from the lower carriage part to the upper carriage part.

This enables a more accurate positioning of the carriage arrangement relative to the selected sales compartments, particularly in the generally vertical Y-direction, since only the significantly smaller mass of the upper carriage part has to be moved and correctly positioned. Any time delays which may occur with the system described in the earlier patent application can be readily tolerated, since the articles are not sold or dispensed continuously and in rapid succession.

One embodiment of transfer arrangement, which is relatively simple in construction yet reliable in operation, incorporates an orientable flap, which is tiltable by a component of the lower carriage part, and which, in the transfer position, forms a path for the articles which is inclined downwardly towards the front of the stand. Therefore, displacement of the lower carriage part causes the flap to be brought into its transfer position without the need for a separate drive, so that it is merely necessary to release the article or articles restrained and carried by the lower carriage part. The or each article is released onto the path formed by the flap, which serves as a slide or chute, and travels down the path or track into a holder or carrier of the upper carriage part. The upper carriage part then carries the or each article in the vertical Y-direction, upwards to the level of the required sales compartment in a previously selected column, and then releases the article so that it is delivered to the correct sales compartment. The latter vertical positioning is carried out after carrying out column selection in the X-direction by means of the X-drive, which displaces the main carriage and the upper and lower carriage parts in unison. Only a single X-drive is necessary in order to displace the main carriage in a controlled manner in the horizontal X-direction.

BRIEF DESCRIPTION OF THE DRAWINGS

Further objects and advantages of the invention will become apparent from the following detailed description taken in conjunction with the accompanying drawings, which illustrate a preferred embodiment of the invention.

FIG. 1 shows, diagrammatically, a sales stand incorporating a conveying system embodying the invention;

FIG. 2 is a side view of the conveying system shown in FIG. 1;

FIG. 3 is a side view of the upper carriage part 34 shown in FIGS. 1 and 2;

FIG. 4 is a front view of the upper carriage part in the direction of the arrow IV in FIG. 3;

FIG. 5 is a plan view of the upper carriage part in the direction of the arrow V in FIG. 4;

DETAILED DESCRIPTION OF THE PREFERRED EMBODIMENT

Figure 6:
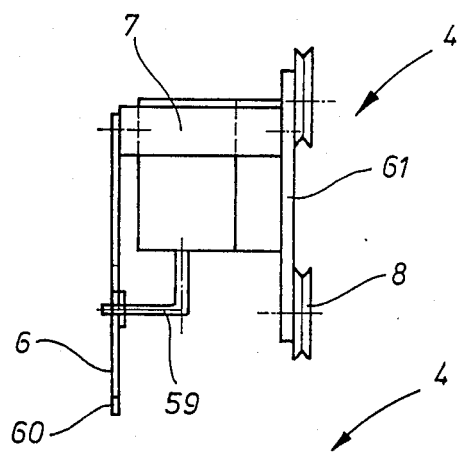
FIG. 6 is a side view of the lower carriage part 4.

The sales stand shown in FIG. 1 includes a frame, for example a rectangular frame 1, having upper and lower horizontal frame tubes and vertical frame tubes. The frame forms a rectangular housing, the edges of which are defined by the frame tubes. A lower horizontal track rail 2 and an upper horizontal track rail 2' are arranged in the frame 1, and are firmly connected with the lateral, vertical frame tubes.

The conveying system includes an X-drive (horizontal drive) in the direction of the arrows 13,14, for displacing a carriage arrangement in its entirety, which will now be described.

In the frame 1, a main or primary slidable carriage 32 is horizontally displaceable in the directions of the arrows 13, 14, i.e. in the X-direction. Two slidable carriage parts or secondary carriages 4, 34 are carried by the main carriage 32 so as to be displaceable vertically, independently of each other, in the directions of the arrows 20, 21, i.e. in the Y-direction.

The X-drive of the main carriage 32 includes a drive motor 12 arranged in the lower corner of the frame 1. This motor, which may be a stepping motor, drives the upper and lower regions of the main carriage 32 in synchronism, via a drive pulley 11. Due to the synchronous drive of the upper and lower regions of the main carriage 32, canting of the main carriage 32 is avoided. In addition, the main carriage is mounted on upper and lower runners or rollers 35, by means of which it rolls along the rails 2,2'.

To drive the upper region of the main carriage 32, the drive motor 12 drives the drive pulley 11. A toothed belt 10 is looped in a vertical direction, and runs over the drive pulley 11 and a lateral, upper guide pulley 15. A horizontal loop of the belt 10 (or a further toothed belt) also runs around a further guide pulley 16 on the opposite sides of the frame. The main carriage 32 has an approximately central catch 57, by which it is fixedly connected with one horizontal run of the toothed belt 10. By this means, the upper part of the main carriage 32 is positively driven in the X-direction.

To drive the lower region of the main carriage 32, a further guide pulley 18 is arranged laterally on the frame 1, and a guide pulley 17 is arranged on the opposite side. The guide pulley 18 is likewise driven by the drive pulley 11 of the motor 12. In a preferred embodiment, provision is made for the guide pulley 18 to coincide with the drive pulley 11, so that both the drive pulley 11 and also the guide pulley 18 are driven by the motor 12. The drive of the lower region of the main carriage 32 takes place via a toothed belt 9, the lower region being connected via a catch 23 with one horizontal run of the toothed belt 9.

The conveying system also includes a Y-drive (vertical drive) carried by the main carriage 32 for individually displacing the two carriage parts 4, 34, which will now be described in further detail.

The main carriage 32 consists of a generally H-shaped frame, which has two mutually spaced, parallel vertical track rails 3. A lower or first slidable carriage part or secondary carriage 4 is mounted on runners or rollers 8 between the rails 3 so as to be displaceable and driveable in the Y-direction, i.e. in the directions of the arrows 20, 21.

In the upper region of the main carriage 32, an upper or second slidable carriage part or secondary carriage 34 is mounted on runners or rollers 8 between two further mutually spaced, parallel track rails 33, so as to be displaceable and driveable in the Y-direction, i.e. in the directions of the arrows 20, 21.

The drive of the lower secondary carriage 4 will now be described in further detail.

In this respect, a first drive motor 19, which may be a stepping motor, is fixedly attached to a bearing support 58 of the main carriage 32, and drives a toothed belt 24 via a drive pulley 26, the lower part of the belt being guided over a guide pulley 25 on the main carriage 32. The lower secondary carriage 4 is connected via a catch 22 with the toothed belt 24. Therefore, the lower secondary carriage 4 can be driven by the motor 19 in the Y-direction, i.e. in the directions of the arrows 20, 21.

The drive in the directions of the arrows 20, 21 for the upper secondary carriage 34 will now be described.

In this respect, a further drive motor 27, which may also be a stepping motor, is arranged on the bearing support 58 of the main carriage 32, and drives a drive pulley 28, over which a toothed belt 29 runs, the lower part of the belt being guided over a guide pulley 31 on the main carriage 32. The upper secondary carriage 34 is connected to the toothed belt 29 by a catch 30. Therefore the upper secondary carriage 34 can be driven by the drive motor 27 in the directions of the arrows 21, 22.

The lower rails 3 of the main carriage 32 extend only up to the level of the bearing support 58, as can be seen in particular from FIG. 2. In this Figure it will also be seen that the upper rails 33 are staggered towards the front of the sales stand, and are oblique with respect to the rails 3. The upper rails 33 have the same mutual spacing as the lower rail 3, but are placed obliquely in front of the lower rails 3, and guide the upper secondary carriage 34.

In FIG. 2, further details are shown of the secondary carriages 4 and 34, which are responsible for transportation in the Y-direction. In particular, the lower secondary carriage is shown both in its lower or retracted position at 4, and also in its upper or extended position at 4'. In the lower position, it can be seen that the lower secondary carriage can precisely pick up a relatively large reel of yarn, cotton or thread 5, or a smaller reel of yarn, cotton or thread 5', from a selected one of a plurality of individual storage compartments of a magazine (not shown in detail). Pick-up is achieved by holding means including lateral grippers 6, which will now be described with reference to FIG. 6 and subsequent Figures. The grippers are actuated by an electromagnet 7.

Figure 7:
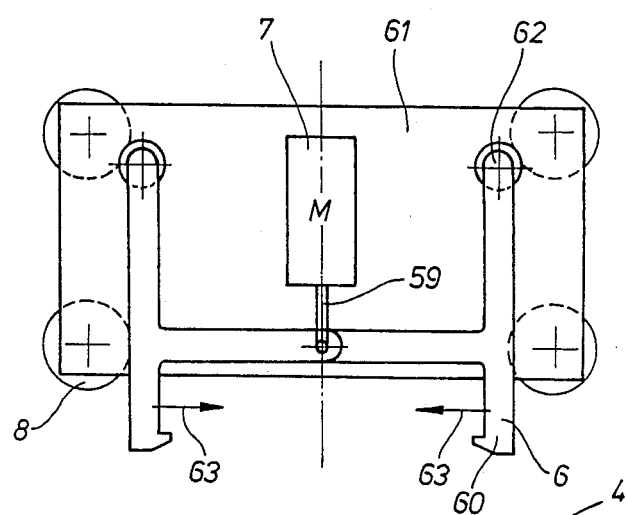
FIG. 7 is a front view of the lower carriage part.
Figure 8:
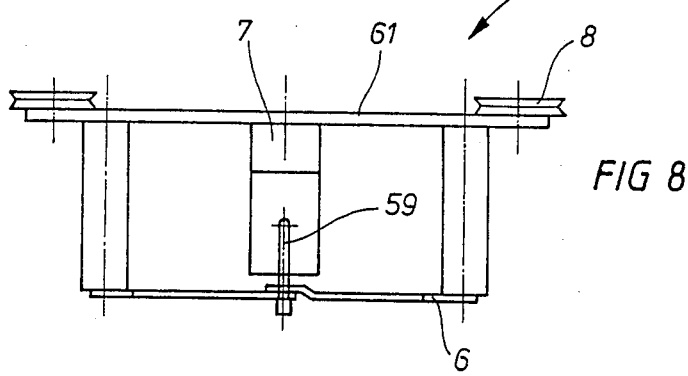
FIG. 8 is a plan view of the lower carriage part.

In FIGS. 6 to 8, the lower secondary carriage 4 is shown in detail. The four runners or rollers 8 are arranged in superimposed pairs on a base plate 61, to which the electromagnet 7 is also attached. The electromagnet 7 is pivotally coupled via a pin 59 to the grippers 6, which take the form of two generally identical elbow or T-shaped levers. Each gripper 6 is mounted for pivotal movement about a bearing or pivot point 62 on the front of the base plate 61, and includes a generally horizontal arm which is pivotally connected to the pin 59 of the electromagnet 7. Therefore, by actuation of the electromagnet 7, gripping arms 60, which are arranged at the lower or free ends of the grippers 6, are moved towards each other in the directions of the arrows 63 in FIG. 7.

By this means, it is possible to pick up the reel 5, or the smaller diameter reel 5', by its side flanges as shown for example in FIG. 2.

The lower secondary carriage can therefore travel from its lowermost position shown at 4 in FIG. 2, upwards in the directions of the arrow 20, to its uppermost position as shown at 4' in FIG. 2.

The upper secondary carriage 34 will now be described, followed by the transfer of a reel of thread 5 or 5' from the lower secondary carriage 4 to the upper secondary carriage 34.

The upper secondary carriage 34 is driven so as to be displaceable in the directions of the arrows 20, 21 between the rails 33, as previously described with reference to FIG. 1.

FIGS. 3 to 5 show further details of this upper secondary carriage 34.

The upper secondary carriage 34 consists of a base plate 53, at the four corners of which the guide rollers 8 are rotatably mounted, and a movable, for example slidable, carriage part 56 carried by and slidable laterally relative to the base plate 53. Extending forwardly from the base plate, and carried by or forming part of the slidable part 56, is a slide or chute 49 as shown in FIG. 3, which forms a path or track inclined downwardly towards the front of the stand. In the front region of the chute are arranged bends 46 of stop or gate means or detents 45. Each stop detent 45 consists of an angular lever, which is mounted on bearings on the side faces of the slidable part 56 of the carriage 34, for pivotal means about the axis 48, and against which an armature 47 of an associated electromagnet 44 is orientably applied. Each electromagnet 44 therefore actuates one of the stop detents 45.

With synchronous or simultaneous actuation of the electromagnets 44, therefore, the bends 46 of the stop detents 45 are moved out of the region of the track or path defined by the floor of the chute 49, so that, as will be described later, a reel 5 or 5' placed on the upper end of the chute is free to roll downwards in the direction of the arrow 64. Therefore, as soon as the electromagnets 44 are actuated, the bends 46 are moved out of the path in the chute 49, and the reel can then advance into a display, dispensing or sales compartment of a magazine adjoining the path and in alignment therewith. The plane of the paths or floors of the lower course or row of sales compartments is shown at 65 in FIG. 2.

The chute path is limited laterally by side cheeks 66 of the chute, and it will now be described how the accurate placing of the chute opposite the respective magazine sales compartment is achieved. The aim of this positioning is to bring the side cheeks 66 into precise lateral coincidence with the associated lateral faces of a selected sales compartment, or column of compartments, of the magazine, and then to bring the path or floor of the chute 49 approximately into alignment with the path or floor 65 of the selected sales compartment of the selected column of the magazine. If the path of the chute 49 of the carriage 34 lies somewhat higher than the floor 65 of the sales compartment, this does not make any difference, because the reels 5,5' can easily roll onto the magazine floor 65, down this small step.

The lateral positioning, i.e. positioning in the X-direction, takes place via the further parts of the upper secondary carriage 34 which are shown in FIGS. 3 to 5, when the carriage 34 is elevated from the position shown in FIG. 2 to the level 25 of the lowermost row of sales compartments. In this respect, on one side face of the part 56 of the upper secondary carriage 34 is arranged a lifting magnet or electromagnet 50, which has a pin 51 as its armature. Adjacent the lifting magnet 50 is a transmitter or sensor 52 which is either constructed as a magneto-resistive resistance or as an inductive proximity switch.

To find a corresponding sales compartment, or column, of the magazine into which a reel of yarn is to be inserted, the entire carriage arrangement, comprising the main carriage 32 and secondary carriages 4, 34, is driven laterally, i.e. in the X-direction 13, 14, so that the entire carriage arrangement comes to lie beneath the selected column of compartments.

The approximately correct position, opposite the sales compartment which has been found, is then sought by means of the drive motor 12. The determination of the location of the sales compartment involves a magnetically coded pin 68, such as a metal pin, associated one with each compartment in the lowermost row, and arranged on a stop face of the associated compartment. The pin 68 may be coded by providing it with a magnetic field pattern which varies around the pin axis, represented by the arcuate arrows in the latter Figure. By turning the pins of the various compartments to different positions, the magnetic field patterns are differently oriented from compartment to compartment, thus providing each compartment with its own specific identifiable code or signature. When a pin 68 having the selected code is detected by the sensor 52 and associated circuitry, the motor 12 is stopped. However, the entire carriage 34 continues to travel laterally in the direction of the arrow 13 somewhat beyond the selected compartment, i.e. somewhat beyond the position detected by the sensor. Then, the mechanical stop pin 51 is extended from the lifting magnet 50. Subsequently, the carriage 34 travels in the direction of the arrow 14, whereby the extended stop pin 51 comes to rest against the stop face provided for this purpose on the selected compartment.

The slidable carriage part 56 of the carriage 34 is thus prevented from further movement in the direction of the arrow 14, whilst the main carriage 32 and the base plate 53 of the carriage 34 continue to travel slightly. This continued travel takes place against the resistance of a spring (not shown) which is arranged between the slidable carriage part 56 and the base plate 53 of the carriage 34. As a result, the slidable carriage part 56 is pressed with its stop pin 51 firmly against the stop face of the respective sales compartment. Thereby, an exact alignment (in the lateral direction 13-14) exists between the path of the sales compartment and the path defined by the chute 49 of the slidable carriage part 56.

If the selected sales compartment is in the lowermost row, a reel of yarn, situated in or on the slidable carriage part 56 and held by the bends 46 of the two stop detents 45, can then be released by actuation of the magnets 44, to roll into the sales compartment.

If the selected sales compartment is in a higher row of the magazine, which will be in the same column as the lowermost compartment with which the chute 49 is laterally aligned, the carriage 34 is elevated to the level of the selected row by its Y-drive 27-30 before the reel is released as just described. For this purpose the rows of compartments are associated with and identified by respective codes, such as line or bar codes attached to the walls of the compartments or magazine, which are read by an appropriate sensor arrangement carried by the carriage 34. During elevation of the carriage 34, precise lateral alignment of the chute 49 with the compartments in the selected column is maintained by sliding cooperation between the stop pin 51 and appropriate vertical guide surfaces (not shown), for example associated with the walls of the magazine, or walls 69 (FIG. 9) of the compartments in the various rows and forming continuations of, or being aligned with, the stop face of the lowermost compartment in the selected column.

The transfer of a reel of yarn 5 or 5' from the lower secondary carriage 4 to the upper secondary carriage 34 will now be described in further detail with reference to FIG. 2.

An upper catch plate 42 can be seen in FIG. 2 in the lowermost position of the lower carriage 4, and when the carriage 4 is raised from this position in the direction of the arrow 20, this catch plate 42 strikes against the free rockable end of a swivel arm 40 which is pivotably mounted in a bearing 41 on the main carriage 32. A connection 43 couples the free rockable end of the swivel arm 40 to the free rockable part of a flap 37 which, in turn, is mounted by a joint or hinge 39 on a fixed path or chute 36 firmly attached to the main carriage 32. In the lowered position of the upper carriage 34 shown in FIG. 2, the plane of this path 36 is precisely in alignment with the upper edge of the chute path 49 of the carriage 34.

As the carriage 4 ascends and before it actuates the arm 40, the flap 37 will be disposed in a downwardly hinged position out of the path of the carriage 4. As the carriage 4 approaches its uppermost position, the catch plate 42 strikes against the swivel arm 40, hinging the flap 37 anti-clockwise beneath the elevated reel 5 or 5'. When the carriage 4 has ascended into the position shown in FIG. 2, the flap 37 is lifted up and assumes the position shown. Hence, a continuous path is formed, consisting of the flap 37, the chute path 39, and the chute path 49 of the carriage 34. The reel of yarn 5 or 5', which is still held by the grippers 6 and 6', can now roll down onto this path or plane upon release of the grippers, and thereby be transferred to the carriage 34, rolling in the direction of the arrow 64 over the chute path 49 and striking against the bends 46 of the stop detents 45 carried by the carriage 34. Consequently, the carriage 34 with the transferred reel of yarn 5 or 5', can now execute the positioning operation relative to a sales compartment selected from the columns and rows of compartments of the magazine as previously described.

For the positioning in the X-direction, therefore, in the region of the lowermost row of compartments, firstly the columns of magazine compartments are counted off, with the entire carriage arrangement, i.e. the main carriage 32 and secondary carriages 4, 34, travelling in the X-direction. When the correct column of magazine compartments has been found, the Y-drive of the carriage 34 is actuated, and then the charging takes place, into the selected magazine compartment, of the reel of yarn conveyed by the carriage 34.

However, before the reel is introduced into the associated magazine compartment, the reel is additionally identified according to a code applied to the flange or to the reel or spool roll, so that the correct reel can be assigned to the correct sales compartment. For this, provision is made, in a manner which is not shown in detail, in the region of the frame 1, and specifically in the region of travel of the upper carriage 34 and main carriage 32, for a bar code reader. Thus, the main carriage 32 with its upper carriage 34 and the associated reel of yarn first travel to the bar code reader, the bar code reader identifies the corresponding reel or spool and, according to the reel identification, controls charging of the reel into the appropriate sales compartment of the magazine.

Figure 9:
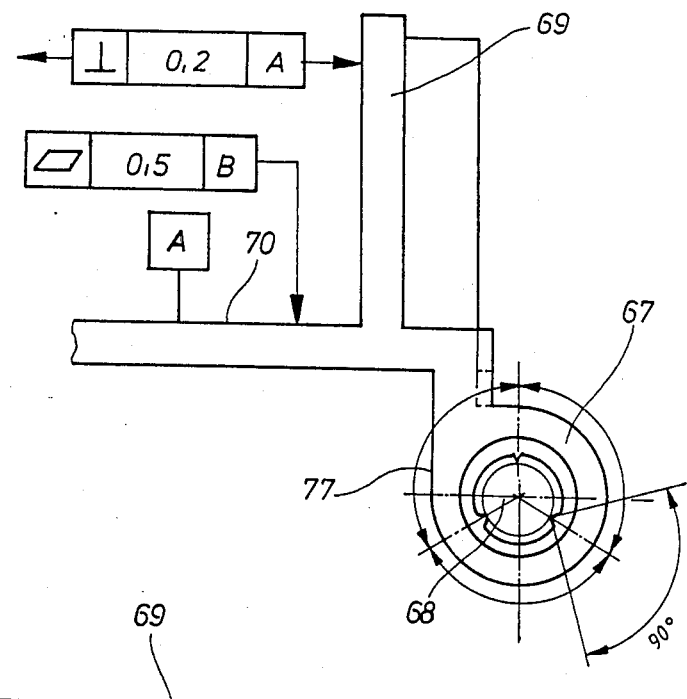
FIG. 9 is a rear view of the right-hand part of a sales compartment, on an enlarged scale, to illustrate how precise positioning is achieved.
Figure 10:
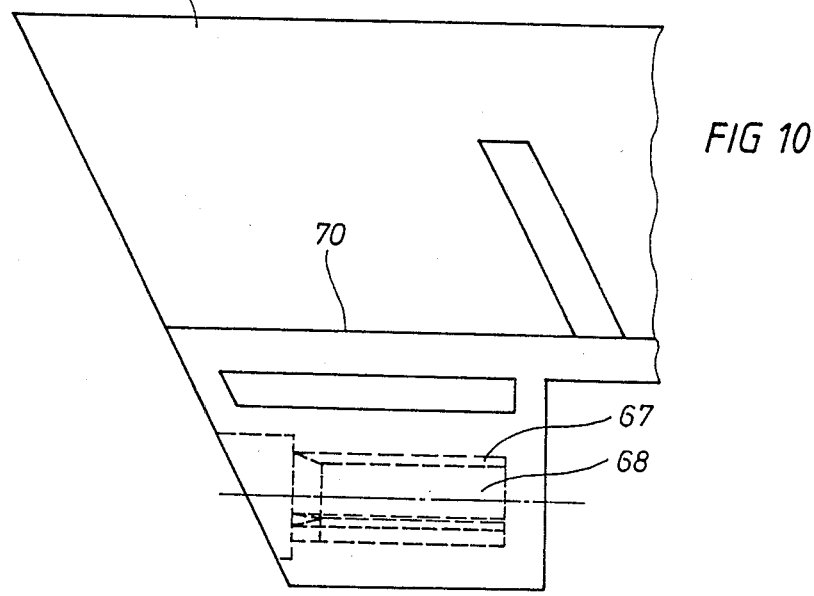
FIG. 10 is a side view of the sales compartment of FIG. 9.

For the precise positioning of the upper carriage 34 in relation to the selected sales compartment or column, reference will now be made to FIG. 9 which shows the right-hand lateral wall 69 of a sales compartment having a floor or path 70. It should be noted that the position of the sales compartment shown in FIG. 9 is reversed relative to FIG. 2, and that the floor 70 is shown horizontal whereas it will be inclined to correspond to the plane 65 in FIG. 2, and the left-hand or rear face of the compartment will be turned from the inclined position shown in FIG. 9 into a vertical position. Generally beneath the wall 69 is a holder 67, in which the magnetically coded pin 68 of a metal, such as steel, or other magnet-sensitive material, is contained. This pin is thus firmly attached to the sales compartment, at the rearwardly facing lower end of that compartment. The pin 68 serves to enable the compartment to be identified and located by the previously described sensor, which is attached to the upper carriage 34. Additionally or alternatively the sales compartment may be provided on its vertically and horizontally extending surface with codes such as bar codes (see the arrowed boxed symbols in FIG. 9) which can be read by an appropriate reader carried by the passing carriage 34.

Firstly, with the lower carriage 4 in its lowermost position, the main carriage 3 is conveyed in the X-direction to align the lower secondary carriage 4 with a selected storage compartment in the base of the stand. Identification and selection of the storage compartment may be achieved in a manner based on that described in the aforementioned earlier German application, for example by appropriate bar codes etc. associated with the individual compartments which are read by a reader carried by the carriage 32 (or 34). When an appropriate reel has been picked up by the lower carriage 34, the latter carriage is elevated to the position indicated at 4' in FIG. 2, where the reel is transferred to the upper secondary carriage 34 as previously described. The carriage 34 is then elevated to the level 65 of the lowermost row of sales compartments.

Thereafter, to locate a selected sales compartment, or the column containing the selected compartment, the entire main carriage 32 is conveyed in the X-direction, such that the upper secondary carriage 34 is driven a specific distance adjacent to the openings in the sales compartments in the lowermost row. At the same time the proximity sensor 52 travels past, and scans, the magnet-sensitive pins 68 of the row of the compartments. When the sensor senses the pin 68 associated with the predetermined selected compartment or column, it emits a signal, which stops the driving motor 12 for the X-drive and at the same time reverses the polarity of the motor supply, so that the motor is braked within a short distance. The electronic arrangement recognises that the driving motor has overshot the selected compartment/column. The electronic arrangement therefore issues a command to the driving motor to travel by this distance in the reverse direction, plus a safety distance in order to balance out corresponding tolerances. As already mentioned, the extended stop pin 51 now engages the stop face 71 on the sales compartment.

For safety reasons, in order to balance out corresponding tolerances, a longer driving distance is preset for the motor 12 than is actually required. The mechanical stop pin 51 therefore comes to rest against the compartment stop face before the carriages 32, 34 have fully travelled this distance. For this reason, the carriage part 56 is slidably displaceably attached to the base plate of the upper carriage 34, so that when the stop pin 51, which is attached to the sliding carriage part 56, strikes against the side wall or stop face of the selected compartment, the other or base part of the carriage 34 is permitted to travel further for the short distance of displacement remaining, as shown in the drawings, in the X-direction (arrow direction 14), and only then is the driving motor 12 braked.

This specific positioning of the carriage has the advantage that savings are made with regard to a costly electronic searching arrangement, but nevertheless an excellent coordination of the carriage to the charging or selected compartment/column is achieved via the mechanical stop, without the mechanical stop itself or the driving motor being overloaded by driving a mechanical brake.

It will be thus be evident that the carriage arrangement is mounted on corresponding horizontal track rails, namely at the bottom, in the centre approximately below the driving motors for the Y-drive, and right at the top on the frame, so that excellent parallel guidance is achieved. In addition, the lower and the upper parts of the carriage arrangement are driven synchronously, thus avoiding the possibility of canting at all events.

The transfer of the articles from the lower to the upper secondary carriage takes place after the articles have been extracted from storage magazines arranged in rows in the lower part of the sales stand. Each magazine has on its underside a trough (not shown), and one of the spools of yarn or other articles rolls out of the magazine and comes to lie in the trough. The respective article is then taken up by the lower secondary carriage as previously described. It is then conveyed away from the magazine, either directly upwardly in the Y-direction, or laterally in the X-direction. On conveying upwardly, the transfer flap is actuated, which then forms an oblique run-off path towards the front, and the article is then transferred to the upper secondary carriage after the gripper electromagnet of the lower secondary carriage has been disengaged or rendered deenergized. Thereby, the grippers which until then held the article are moved apart and the article rolls over the incline towards the front, into the carrier of the upper secondary carriage, which has its electromagnetically actuatable stops closed to retain the article. The upper secondary carriage is therefore the actual article-conveying carriage, which carries out the transfer of the article into the respective compartment, and on this upper secondary carriage the electromagnetically actuatable alignment stop is provided, together with the magnetoresistive resistance or sensor, as previously described.

It will be understood that various modifications may be made without departing from the scope of the present invention.

For example, the lower secondary carriage may be elevated from the lower level of the row or rows of storage compartments, to the level of the upper secondary carriage, either before or after the carriage arrangement has been displaced in the X-direction to horizontally align the upper secondary carriage with the selected sales compartment, or with the column of sales compartments containing the selected compartment.

The horizontal alignment and sales compartment/column selection, instead of being achieved by coded pins or the like associated with the lowermost row of sales compartments which are sensed by means associated with the upper secondary carriage, may be achieved with coded means disposed elsewhere, for example below the lowermost row of compartments, and/or the sensing may be achieved by means associated with the main carriage instead of the upper secondary carriage.

The hinged transfer flap and/or its rockable actuator arm or equivalent, may be mounted on the upper secondary carriage instead of the main carriage.

What is claimed is:

1. In a dispensing stand for articles, having: a lower storage part including storage compartments for storing the articles therein, a dispenser part arranged thereabove including dispensing compartments for the articles, arranged in rows and columns, which are downwardly inclined towards the front of the stand, have openings for the removal of the articles in their frontal regions and charging openings for the articles in their rear regions; and a conveying system to the rear of the stand for the controlled transportation of the articles from the storage compartments to the dispensing compartments, the conveying system having a carriage arrangement which is displaceable in a generally horizontal (X) direction and in a generally vertical (Y) direction and has a releasable holder for at least one article; the improvement in which the carriage arrangement includes two displaceable carriage parts arranged one above the other and each provided with its own drive, the carriage parts being conveyable in a generally vertical (Y) direction independently of each other and in a controlled manner via their own drives, and in which a transfer arrangement is situated between the two carriage parts, for transferring at least one article from the lower carriage part to the upper carriage part whereby the article is transferred by having the lower carriage travel upwardly, the article rolled from the lower carriage to the upper carriage, and the upper carriage travel upwardly to dispense by rolling the article to the dispensing stand.

2. A stand according to claim 1, wherein the transfer arrangement includes an orientable flap which is tiltable by a component of the lower carriage part, the flap when in the transfer position, forming a path which is inclined downwardly towards the front of the stand for the passage of articles from the lower to the upper carriage part.

3. A stand according to claim 1, wherein the two carriage parts are secondary carriages which are part of, and carried by, a common main carriage, means being provided to displace the main carriage in a controlled manner in a generally horizontal (X) direction.

4. A stand according to claim 3, wherein the upper secondary carriage includes a base part constrained to be generally vertically displaceable by generally vertical rail means carried by the main carriage, and a chute arrangement carried by the base part of the upper secondary carriage and mounted for generally horizontal displacement relative thereto, the chute arrangement including releasable aligning means cooperable with a dispensing compartment in a selected column, during displacement of the main carriage and upper secondary carriage in the X-direction, to index the chute arrangement in alignment with said dispensing compartment whilst the base part of the upper secondary carriage is permitted to overshoot said dispensing compartment.

5. A stand according to claim 2, wherein the two carriage parts are secondary carriages which are part of, and carried by, a common main carriage, means being provided to displace the main carriage in a controlled manner in a generally horizontal (X) direction.

6. A stand according to claim 5, wherein the upper secondary carriage includes a base part constrained to be generally vertically displaceable by generally vertical rail means carried by the main carriage, and a chute arrangement carried by the base part of the upper secondary carriage and mounted for generally horizontal displacement relative thereto, the chute arrangement including releasable aligning means cooperable with a dispensing compartment in a selected column, during displacement of the main carriage and upper secondary carriage in the X-direction, to index the chute arrangement in alignment with said dispensing compartment whilst the base part of the upper secondary carriage is permitted to overshoot said dispensing compartment.

7. A sales unit for dispensing articles, the unit having:
a lower zone containing an array of storage compartments, arranged in at least one row, for storing a plurality of different articles;
an upper frontal zone containing an array of dispensing compartments arranged in rows and columns, the dispensing compartments being chargeable from the rear with articles from the storage compartments, and being dischargeable from the front;

first guide means extending generally in the same direction as said rows of dispensing compartments;

a main carriage disposed rearwardly of the array of dispensing compartments, and guided by said first guide means for reciprocating displacement generally in the same direction as said rows;

first drive means for effecting said reciprocating displacement of the main carriage;

said main carriage including second guide means extending generally in the same direction as said columns of dispensing compartments;

an upper secondary carriage disposed rearwardly of and adjacent the array of dispensing compartments, mounted on the main carriage, and guided by said second guide means for reciprocating displacement generally in the same direction as said columns;

second drive means carried by the main carriage for effecting said reciprocating displacement of the upper secondary carriage;

the extents of the displacements of the main carriage and upper secondary carriage by the respective drive means being such that the upper secondary carriage is alignable with a selected dispensing compartment in any row and in any column of the array of dispensing compartments, so as to permit an article conveyed by the upper secondary carriage to be discharged into a selected dispensing compartment;

a lower secondary carriage mounted on the main carriage and guided by said second guide means for reciprocating displacement between the array of storage compartments in the lower zone of the unit and an elevated transfer location whereat an article is transferable from the lower to the upper secondary carriage;

third drive means carried by the main carriage for effecting said reciprocatory displacement of the lower secondary carriage;

the extent of the displacement of the main carriage by the first drive means being such that the lower secondary carriage is alignable with a selected storage compartment in the array of storage compartments so as to permit an article from a selected storage compartment to be transferred to the lower secondary carriage;

first transfer means, operable when the upper and lower secondary carriages are located at said elevated transfer location, to permit transfer an article from the lower to the upper secondary carriage; and the upper secondary carriage including a chassis part constrained by the second guide means, and second transfer means mounted on and slidable relative to the carriage in the direction of displacement of the main carriage, the second transfer means including retractable first stop means actuable to cooperate with second stop means associated with a column containing a selected dispensing compartment, to stop displacement of said second transfer means in the direction of the main carriage with the second transfer means in precise alignment with the selected column, whilst permitting overshoot of the chassis part and main carriage in said direction.

8. A unit according to claim 7, wherein:

said second guide means comprises lower and upper rail means on which the lower and upper secondary carriages are respectively mounted;

said elevated transfer location is defined by overlapping zones of said upper and lower rail means, and the upper and lower secondary carriages, when displaced to said transfer location, are disposed at generally the same level, with the upper secondary carriage disposed intermediate the lower secondary carriage and the plane of the rear of the array of dispensing compartments, and with said first transfer means disposed intermediate the upper and lower secondary carriages in an operative position defining a transfer path for an article from the lower to the upper secondary carriage;

said first transfer means comprises a flap mounted on the main carriage, for pivotal movement from an inoperative downwardly depending position providing clearance for the displacement of the lower secondary carriage there past, upwardly to said operative position in which it bridges the upper and lower secondary carriages and defines said article transfer path; and the flap is pivotable from its inoperative to its operative position by flap actuating means cooperable with and actuated by the lower secondary carriage as it approaches the transfer location.

9. A unit for dispensing cylindrical articles such as spools of thread, according to claim 8, wherein:

the lower secondary carriage includes releasable holding means operable to pick-up an article from a selected storage compartment;

the second transfer means of the upper secondary carriage comprises chute means including a floor defining an article path which is inclined downwardly towards the plane of the rear of the array of dispensing compartments, and releasable gate means adjacent the lower end of said path to releasably retain an article on the chute means of the upper secondary carriage; and the transfer flap, in its operative position, extends beneath an article held by the holding means, and defines an article transfer path inclined downwardly towards, and communicating with, the article path of the chute means when the upper secondary carriage is located at the transfer location;

whereby an article, when released by said holding means at the transfer location, will roll down the article paths of the flap and chute means, and will be releasably arrested by said gate means of the chute means.

10. A unit according to claim 9, wherein:

the transfer location is disposed below the level of the array of dispensing compartments;

the dispensing compartments of the lowermost row of dispensing compartments are each provided with coded means identifying the column to which that compartment belongs, readable by sensing means carried by the chute means of the upper secondary carriage, and each associated with said second stop means cooperable with said first stop means of said chute means;

the upper secondary carriage, after transfer of an article thereto, is displaceable upwardly by said second chute means to the level of the lowermost row of dispensing compartments, and is displaceable transversely along the row by displacement of the main carriage by the first drive means; and the sensing means, upon sensing a preselected coded means, is operable to de-energise the first drive means to stop the main carriage after the upper secondary carriage has overshot the associated dispensing compartment by a small distance, to actuate the first stop means of the upper secondary carriage, and to reverse the first drive means to reverse the direction of travel of the main carriage to cause said first stop means to engage the second stop means of the associated dispensing compartment and thereby stop the reverse travel of the chute means of the upper secondary carriage in precise transverse alignment with the associated dispensing compartment, whilst the sliding mounting of the chute means permits a limited amount of overshoot of the main carriage and chassis part of the upper secondary carriage in said reverse direction.

11. A unit according to claim 10, including spring means connected between the chassis part and chute means of the upper secondary carriage which is operable to resiliently bias the first stop means into engagement with the second stop means when the main carriage and chassis part overshoot in said reverse direction.

12. A unit according to claim 10, wherein:

the dispensing compartment to be selected is said associated compartment in the lowermost row; and the gate means of the aligned chute means of the upper secondary carriage is released to permit the article to roll from the chute means onto a forwardly and downwardly inclined floor of said selected compartment.

13. A unit according to claim 10, wherein:

the selected compartment is located at an elevated position in the column to which said associated lowermost compartment belongs;

after alignment of the chute means of the upper secondary carriage with said associated lowermost compartment, the second drive means is actuated to elevate the upper secondary carriage to the level of the selected compartment whilst maintaining the carriage in precise alignment with the column; and the gate means of the aligned chute means is then released to permit the article to roll from the chute means onto a forwardly and downwardly inclined floor of said selected compartment.

* * * * *